Figure 1:
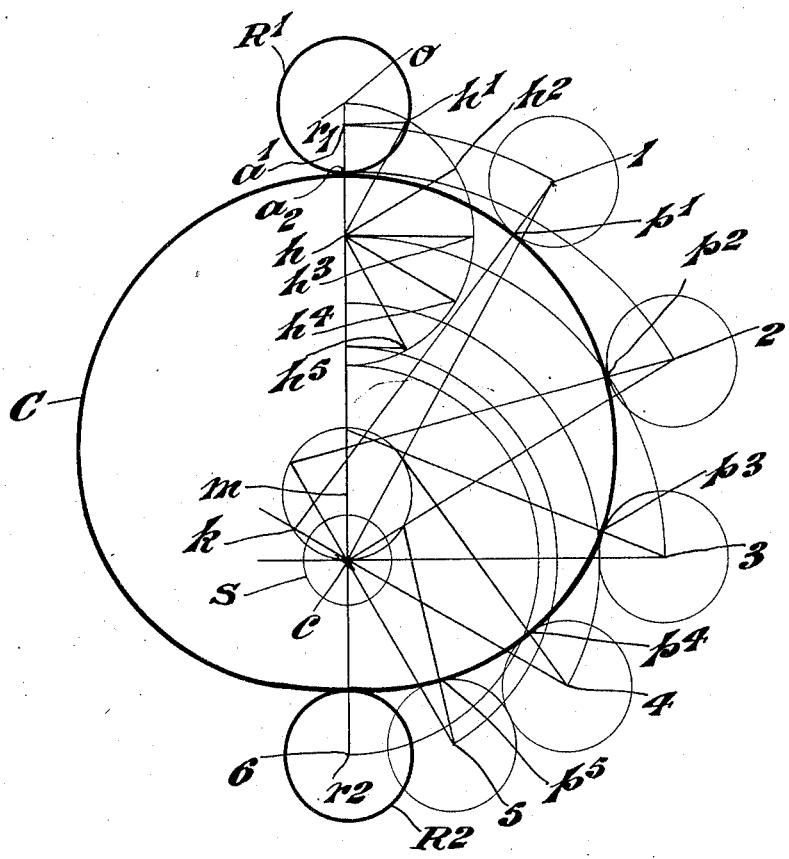

June 25, 1929.  J. BRYANT  1,718,894

POWER TRANSMISSION MECHANISM

Filed Oct. 11, 1927  2 Sheets-Sheet 1

Inventor
John Bryant
By B. Singer, Atty

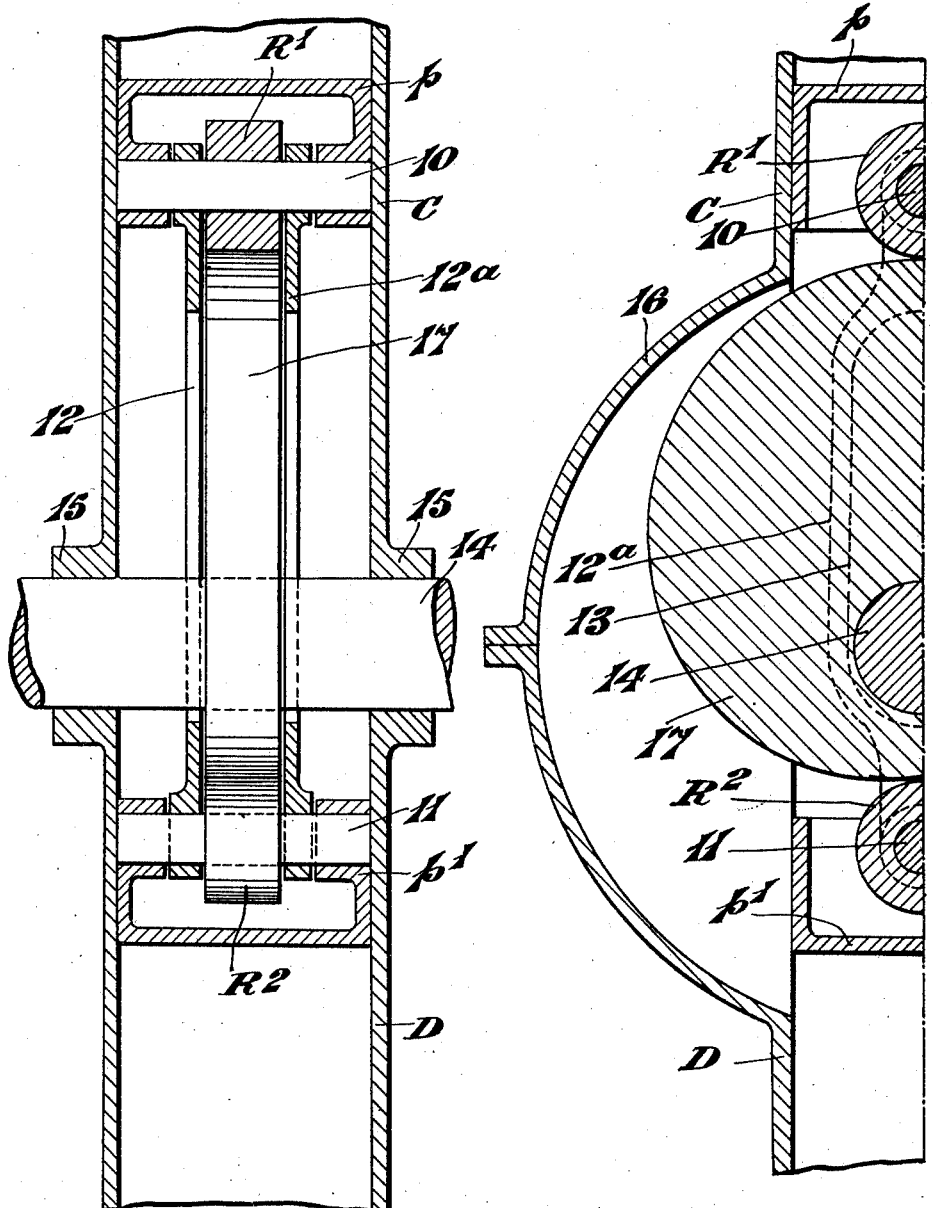

Patented June 25, 1929.

1,718,894

UNITED STATES PATENT OFFICE.

JOHN BRYANT, OF CARDIFF, WALES.

POWER-TRANSMISSION MECHANISM.

Application filed October 11, 1927, Serial No. 225,516, and in Great Britain June 28, 1926.

This invention relates to power transmission mechanism for changing reciprocating motion into rotary motion and vice versa. Heretofore in mechanism consisting of oppositely disposed coaxial power cylinders or pumps having rigidly connected pistons, it has been proposed to transmit power from the pistons to the shaft or vice versa through a cam of which the opposite sides are constantly in contact with rollers carried by the oppositely disposed pistons.

The present invention comprises power transmission mechanism of the type consisting of a cam working in conjunction with two rollers carried on a reciprocating member and adapted to engage opposite sides of the cam simultaneously at all angular positions of the cam, characterized by the cam surface being constructed to give simple harmonic motion substantially as described.

The member carrying the roller may be arranged to reciprocate in one or more guides. Two co-axial guides may be provided one on each side of the cam axis and adapted to guide the two ends of the roller carrying member respectively.

The guide may be in the form of a cylinder having a power transmitting or receiving piston connected to one end of the roller carrying member, and in the case where two co-axial guides are used each may be in the form of a cylinder having a power transmitting or receiving piston connected to one end of the roller carrying member.

The cylinder having the power piston may be that of an internal combustion engine, and the cylinder having a power receiving piston may be that of a charge or air compressor.

The contour of the cam is a continuous curve generated by the points of contact of each of the rollers when the cam is rotating through one complete revolution and the roller carrying member reciprocating in a similar manner to that necessary to give simple harmonic motion.

A cam thus formed is symmetrical about the major axis but lines at different angles from edge to edge passing through the centre of rotation are not equal.

When employing the mechanism to convert a reciprocating motion to a rotary motion a force producing linear motion is applied to the roller carrying member, the external guides being held stationary.

The two extremities of the linear motion representing each end of the stroke are reached when the points of contact between the two rollers and the cam periphery are in line with the centres of rotation of the cam and rollers. This occurs for two angular positions of the cam, that is, when the cam has moved through 180°. In all other positions the lines joining the points of contact to the roller centres are inclined to the line joining the roller centres which also passes through the centre of rotation of the cam. A torque is thus applied to the cam thereby producing rotation of the cam.

A further feature of the device is that a varying crank length effect is obtained as the distance of the points of roller contact and the cam centre varies with angular movement of the cam. Due to this feature a more uniform torque is applied compared with the crank and connecting rod motion wherein the ratio of stroke to length of connecting rod is fixed.

If the cam be fixed, and the external guides rotated, the roller carrying member will reciprocate whilst rotating.

Whatever the application of the mechanism, a pure rolling contact between the rollers and the cam periphery is ensured by limiting the length between the roller centres to some definite ratio of the stroke. Rolling contact is destroyed and slip takes place between the rollers and the cam when the force causing angular acceleration of the rollers about their own centres overcomes the frictional force of the points of contact. High roller accelerations are eliminated by arranging the cam contour or curvature without any change in sign, that is, without points of inflection in the curvature.

In applying the mechanism to internal combustion engines, two cylinders diametrically opposed may take the place of the guides for the roller carrying member, or the engine may be of the single cylinder type, and in applying the device to an engine having a row of cylinders the cams of the adjacent cylinders are arranged at different angles on a common shaft.

In the accompanying drawings Figure 1, is a diagram illustrating a method of forming the contour of the cam, Figure 2 a sectional front elevation of the mechanism applied to an engine having opposed co-axial cylinders, and Figure 3 is half of a vertical side elevation of Figure 2.

In Figure 1 C is the cam and $R^1$, $R^2$ the two rollers of which the distance between the two centres $r^1$ and $r^2$ is invariable. The cam C is fixed on a shaft S.

In constructing the cam contour any convenient series of angular positions of the cam are taken. In the present case they are at intervals of 30°, giving positions of the roller from its highest position $o$ to its lowest position 6. In use the rollers $R^1$, $R^2$ move along a line joining their centres, but to facilitate the construction of the cam it is assumed that the cam is stationary and that the centre line between the rollers takes up the various angular positions and at each of which it passes through the axis of the cam which in the present case is the axis of the shaft S.

On a line joining the centres of the rollers $R^1$, $R^2$ is the starting position $o$. Describe a circle of radius $h\ o$ equal to half the desired stroke of the cam and from its centre $h$ draw radial lines $h\ o$, $h^1$ to $h^5$ at the same angular distances apart as radial lines $c$–1 to $c$–5 on the cam. From $h^1$ draw a line $h^1$, $a^1$, perpendicular to $o\ h$ and from the axis $c$ as centre and with $c$, $a^1$ as radius draw a circular arc cutting $c$–1 at 1. From the centre $m$ on the line $o$, $c$ with radius $m$, $c$ equal ¼ the desired strokes of the cam describe a circle, and on the radial line $c$–1, draw a perpendicular $c$, $k$. Draw a line from the point $k$ where the line $c$, $k$ cuts this circle to the centre 1 of the position of the roller after its movement through the angle $o$, $c$–1; this line will be found to cut the roller circle at a point of contact $p^1$ which forms a point on the cam surface. The points $p^2$, $p^3$ $p^4$ and $p^5$, and any desired number of intermediate points are found in the same manner by taking a corresponding number of angular positions of the line joining the centres of the roller $R^1$ and $R^2$.

Figures 2 and 3 illustrate a practical application of the mechanism. In this example two coaxial cylinders C and D form guides in which move pistons $p$, $p^1$. These pistons which may be those of single acting internal combustion engines are connected by gudgeon pins or pivots 10, 11 to the opposite ends of a link or strap 12, the rollers $R^1$, and $R^2$ being mounted on these gudgeon pins and are thereby connected to opposite ends of the link 12. The link 12 is provided with a slot 13 so that it can reciprocate freely over a shaft 14 forming the power shaft of the engine and which rotates in bearings 15 formed in the casing 16 of the engine. The link 12 is duplicated as $12^a$ on the opposite side of the rollers $R^1$ and $R^2$ and these rollers engage the opposite sides of a cam 17 at all angular positions of the cam while a line through the centres of the rollers $R^1$, and $R^2$ also passes through the axis of the cam 17 which is the same as that of the shaft 14.

What I claim and desire to secure by Letters Patent is:—

Power transmission mechanism comprising a body having a pair of guide elements arranged in line with each other, a cam having a shaft mounted in bearings in said body and arranged between said guide elements, a link having a longitudinal slot through which said shaft extends, a pair of reciprocating elements mounted in said guide elements and pivotally connected to the ends of said link, and rollers mounted in said reciprocating elements, coaxial with the pivots of said reciprocating elements and engaging opposite sides of the periphery of said cam, the periphery of said cam being constructed to give a simple harmonic motion.

In witness whereof I affix my signature.

JOHN BRYANT.